J. A. HAASE.
Safety-Steps for Cars.

No. 162,060.　　　　　　　　　　　Patented April 13, 1875.

Witnesses
Thomas J. Bewley
George C. Hetzel

Inventor
John A. Haase
By His Attorney
Stephen Ustick

THE GRAPHIC CO.PHOTO-LITH.39 & 41 PARK PLACE,N.Y.

UNITED STATES PATENT OFFICE.

JOHN A. HAASE, OF PHILADELPHIA, PENNSYLVANIA.

IMPROVEMENT IN SAFETY-STEPS FOR CARS.

Specification forming part of Letters Patent No. 162,060, dated April 13, 1875; application filed January 16, 1875.

*To all whom it may concern:*

Be it known that I, JOHN A. HAASE, of the city and county of Philadelphia, in the State of Pennsylvania, have invented an Improvement in Brakemen's Safety-Step for Railroad-Cars, of which the following is a specification:

Heretofore many accidents have occurred to brakemen in coupling cars by the train moving quickly after the coupling, and their feet catching in the switches or frogs, or in holes or other obstructions in the road, and loss of life has often resulted therefrom. To avoid this is the object of my invention.

The nature of the invention consists in providing each car with a step at each platform, at the opposite sides of the car, whereby a step may be used in the coupling of any two cars at either side of the train, as hereinafter described.

The step turns on an axis or pivots, and is provided with a counter-weight, whereby it is turned up out of the way when not in use.

Figure 1:
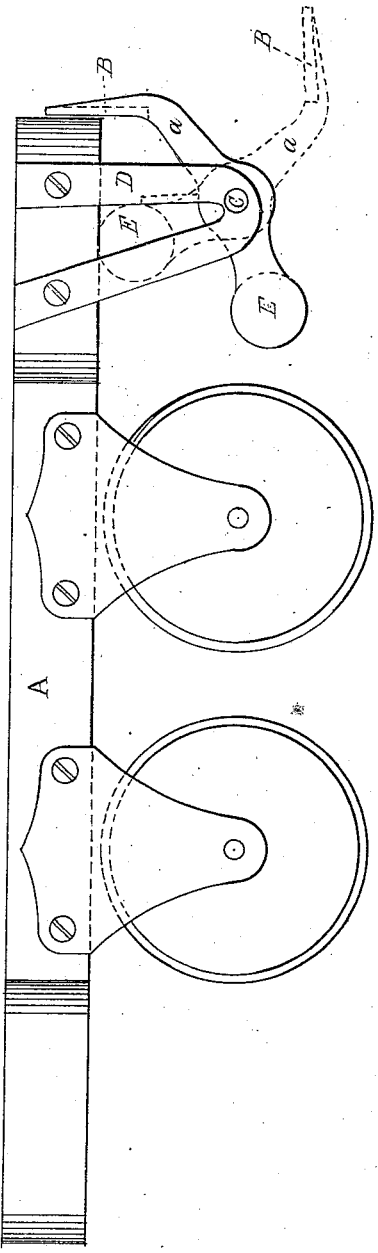
Figure 2:
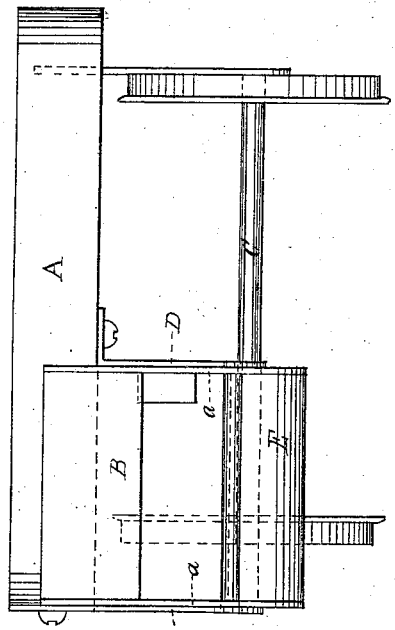

In the accompanying drawings, Figure 1 is a side elevation of a car or truck having my improvement connected therewith. Fig. 2 is an end elevation of the same.

Like letters of reference in both figures indicate the same parts.

A represents a car or truck, at one corner of which is a step, B, provided with arms $a\ a$, fast on the horizontal shaft C, whose ends turn freely in the lower ends of the hangers D, confined to the platform in any convenient manner. The arms $a\ a$ project inward from the shaft C, and are provided with a counter-weight, E, for turning the step up out of the way when not in use, as seen in full lines.

When the brakeman wishes to use the step he presses it down into its lower position, as shown by dotted lines, and steps upon it, and is not liable to be tripped up by the starting of the train, and may pass from the step to the ground, even after the train is in rapid motion. When the brakeman is off of the step the counter-weight E brings it to its upward position, out of the way, as seen in full lines.

Instead of the counter-weight extending the whole distance between the arms $a\ a$, it may be connected with but one of them, or to the shaft C.

I claim as my invention—

The combination of the supporting-plates with the lever $a$, pivoted thereto, and provided at one end with a step, and at the other end with a retracting-weight, for automatically raising the step and lever out of the way when not in use, all substantially as set forth.

JOHN A. HAASE.

Witnesses:
THOMAS J. BEWLEY,
STEPHEN USTICK.